United States Patent Office

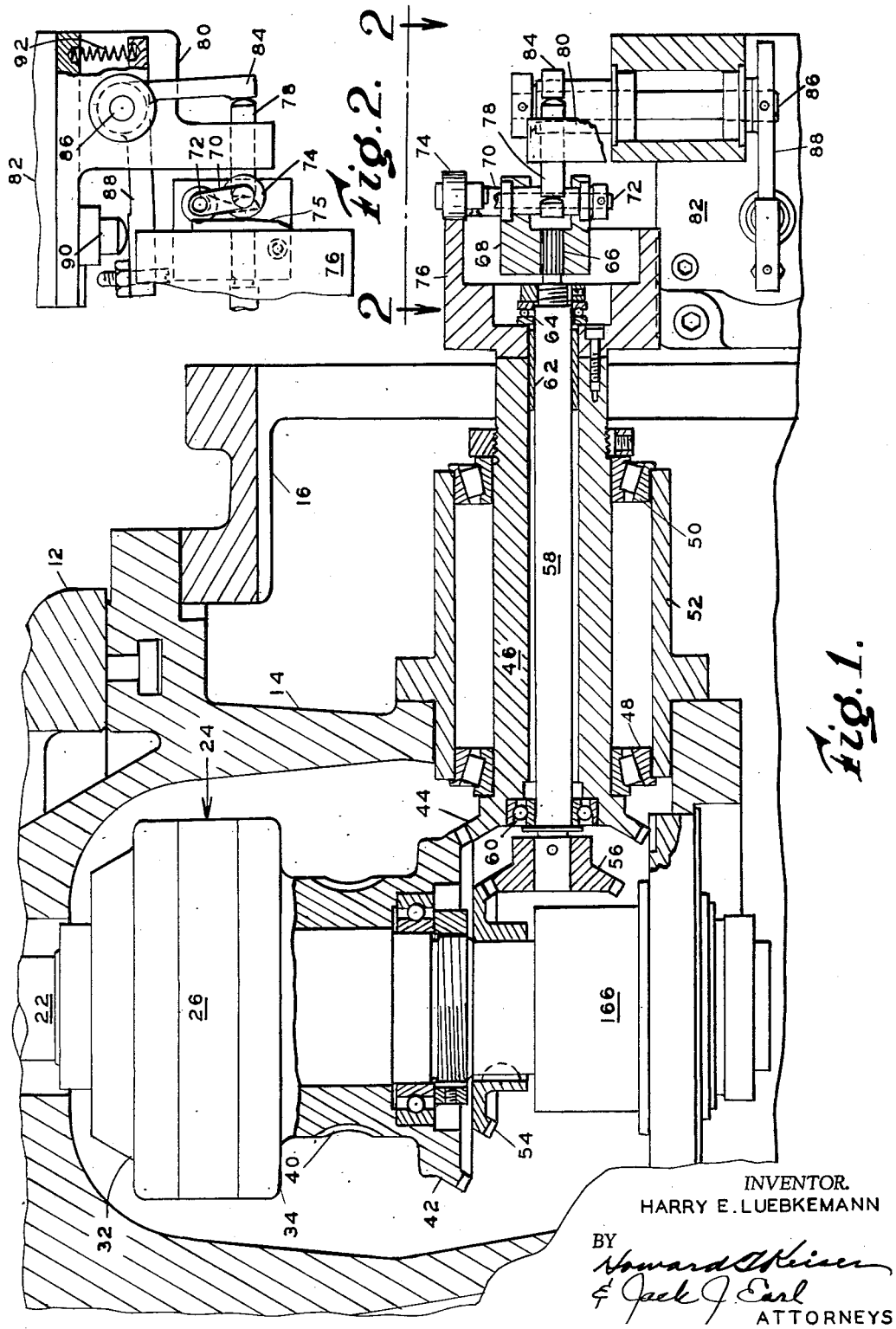

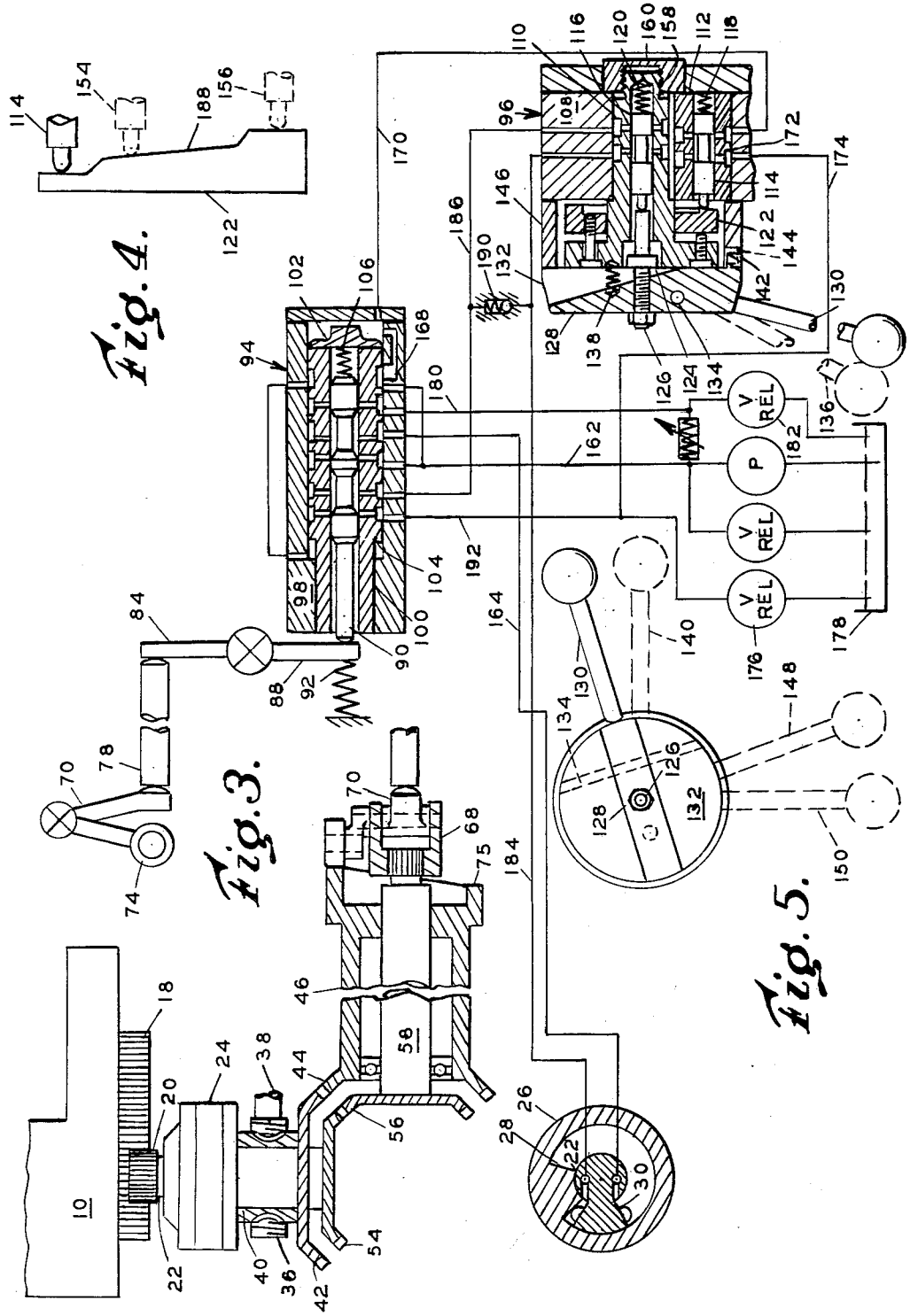

3,130,525
Patented Apr. 28, 1964

3,130,525
SERVO CONTROLLED GRINDER INFEED
MECHANISM
Harry E. Luebkemann, Wilmington, Ohio, assignor to
The Cincinnati Milling Machine Co., Cincinnati, Ohio,
a corporation of Ohio
Filed Feb. 20, 1963, Ser. No. 259,857
8 Claims. (Cl. 51—165)

This invention relates to a feed mechanism for a precision grinding machine and more particularly to a hand servo controlled infeed mechanism adapted for use in a machine having an angular stroke, paddle type, infeed motor connected to move a wheelhead.

A paddle type, angular stroke motor is particularly suited for use in precision grinding machines of the configuration commonly referred to as universal and in which the wheelhead can be swung on an axis to angularly position the grinding wheel for grinding surfaces having other than straight cylindrical shapes. The axis of the shaft extending through the motor and the axis on which the wheelhead is swung are made to coincide such that when the wheelhead is angularly shifted, there is no difficulty in maintaining the driving connection of the motor to the wheelhead through a rack and pinion drive. The paddle motors are compact and are enclosable entirely in the machine base below the wheelhead. Movement of the wheelhead independent of operation of the motor is easily facilitated by the forming of a worm wheel on the paddle motor body which may then be driven by a worm and handwheel or other independent power mechanism. In the past, grinding machines having angular stroke paddle motors have used these motors to produce a rapid advance stroke only and then the feed movement is produced by utilization of the worm and worm wheel drive. This means that a second feed motor must be used as well as the paddle motor. Since the second motor is preferably a rotary type motor driving the worm, the "feel" of the infeed movement of the wheelhead is lost and the machine operator cannot exercise any of the skill which a proficient grinder operator has. This is particularly important in grinding machines which do not have automatic gauge control which replaces the operator's skill to some extent.

It is therefore an object of this invention to provide a grinding machine with a single motor of the rotary paddle type to produce both rapid advance movement and feed movement of a grinding wheel.

It is also an object of this invention to provide a paddle motor with a hand servo control mechanism, the operation of which will produce both rapid and feed movement of a grinding wheel without loss of "feel" to the operator.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

A grinding machine constructed in accordance with the preferred form of this machine utilizes a paddle motor to drive a pinion engaged with a rack secured to the wheelhead of the machine. The paddle motor is operated to produce both rapid and feed movement in response to the metering of fluid under pressure thereto by a hand controlled servo valve. To close the servo loop, movement of the wheelhead is fed back to the servo valve by means of a mechanical system which responds only to movement of the wheelhead by operation of the paddle motor and not by any external power source such as the positioning handwheel which drives a worm engaged with a worm wheel integral with the paddle motor for set-up positioning of the wheelhead.

A clear understanding of the construction and operation of this invention can be obtained from the following detailed description in which reference is made to the attached drawings wherein:

FIG. 1 is a section view of a portion of a grinding machine showing a mechanical feedback from a paddle motor to a servo valve.

FIG. 2 is a partial plan view of the feedback mechanism of FIG. 1 from line 2—2.

FIG. 3 is a schematic showing of a hydraulic operating circuit for a grinder infeed mechanism.

FIG. 4 is a development view of a cam included in the hydraulic control mechanism.

FIG. 5 is an elevation view of a hand infeed control lever for the grinding machine.

The plunge feed mechanism for a hydraulic grinding machine is shown in FIG. 1 and this mechanism is operated to slidably shift a wheelhead 10 (FIG. 3) on ways formed on the top of an angularly adjustable member 12 that is received on top of drive housing 14 which in turn is fixed on the machine base 16. A rack 18 is attached to the wheelhead 10 and it is engaged by a pinion 20 which is fixed on the end of a drive shaft 22. The drive shaft 22 is rotatably received in the housing 14 and a saddle motor unit 24 is assembled with it to produce both rapid movement and feed movement rotation of the pinion 20 for shifting the wheelhead 10 through corresponding rapid and feed movements. As shown schematically in FIG. 3, the motor 24 includes an annular housing 26 through which the shaft 22 is passed. A wall portion 28 of the housing 26 extends radially inward to the shaft 22 and a paddle portion 30 fixed to the shaft 22 and forming a part thereof extends radially away from the shaft 22 to the housing 26. The top and bottom of the housing 26 are sealed by a pair of cover plates 32, 34 fixed on the housing 26 through which the shaft 22 is rotatably journalled. The paddle 30 and wall 28 divide the cavity within the housing 26 into two spaces and by the selective connection of a fluid pressure differential between the two spaces while the housing 26 is held stationary, the paddle 30 can be forced to swing around in the cavity one way and the other to rotate the shaft 22 one way and the other with a resulting movement of the wheelhead 10. The housing 26 and cover plates 32, 34 are held stationary during operation by a worm 36 which is fixed to a shaft 38 extending through the drive housing. The worm 36 is engaged with a worm wheel 40 extending below the lower cover plate 34 and integral therewith. The shaft 38 is rotatable in the housing 14 and may be utilized to rotate the motor unit 24 and shaft 22 together to shift the wheelhead 10 by other means, as for example a handwheel (not shown) connected to rotate the shaft 38 in any well known manner. A paddle motor of the type described is shown and described in detail in U.S. Patent 3,034,265, issued May 15, 1962, on an application filed by Jacob Decker.

In the present arrangement, the paddle motor unit 24 is used to produce both a rapid advance and a feed movement of the wheelhead 10. The motor unit 24 is operated as a servo-motor with provision for a mechanical feedback system between the motor 24 and its hydraulic control circuit to close the servo-loop such that the control circuit is constantly apprised of the actual movement of the wheelhead by operation of the motor unit 24. The mechanical feedback system is unaffected, however, due to any shift of the wheelhead 10 resulting from a rotation of the shaft 38 and worm 36.

A bevel gear 42 is fixed to the worm wheel 40 and is rotated therewith. The bevel gear 42 drives a gear 44 integral with a shaft 46 which is rotatable in bearings 48, 50 received in a tubular member 52 fixed to and extending through the side of the drive housing 14. A bevel gear 54 is fixed to the shaft 22 below the motor unit circuit 24 and gear 42, and it drives a gear 56 which is fixed on the end of a shaft 58. The shaft 58 is rotatably received through the shaft 46 in a bearing 60, a journal bushing 62 and a thrust bearing 64. Thus, when the motor 24 is operated to rotate the shaft 22, the shaft 58 is rotated correspondingly in the shaft 46 which is held stationary with the worm wheel 40. The outer end 66 of the shaft 58 is serrated to receive a member 68 in which a lever 70 is swingably mounted on an axle 72 off-set from the axis of the shaft 58 (see also FIG. 2). One leg of the lever 70 carries a roller cam follower 74 engaged with the annular cam end face 75 of a cam member 76 which is fixed on the end of the shaft 46 around the member 68. The other leg of the lever 70 bears against a plunger 78 which is slidable through a bracket 80 fixed on a hydraulic block 82 that extends from the side of the base 16. The plunger 78 bears against an arm 84 fixed on one end of an axle 86 rotatably received through the bracket 80. A lower arm 88 is fixed on the other end of the axle 86 and bears against a valve plunger 90 extending out of the block 82. A spring 92 is compressed between the arm 88 and the block 82 such that the force of the spring is transmitted back to hold the roller follower 74 against the cam 76 and tends to move the member 68 onto the splined portion 66 of the shaft 58. The cam 76 is shaped such that as the roller 74 is swung in one direction around the cam 76, the lever 70 is swung in the member 68 to move the plunger 78 toward the right, as viewed in FIG. 1, and when the cam 76 is rotated in the other direction, the lever 70 is swung to move the plunger 78 back leftward by the force of the spring 92. With these motions of the lever 70 and plunger 78, the arm 88 is first moved away from the plunger 90 and then forced back toward it by the spring 92. These motions of the arm 88 correspond to movement of the wheelhead 10 by operation of the paddle motor unit 24 one way and the other. When the motor 24 is not operated and the worm 36 is rotated, the entire motor unit 24 and shaft 22 are rotated in unison. Therefore both of the shafts 46 and 58 are rotated together and there will be no relative motion of the roller 74 on the cam member 76. Since the plunger 78 is contacted at a point on the axis of rotation of the shafts 46 and 58, the plunger 78 will not be shifted. This allows the wheelhead 10 to be adjusted on the member 12 without affecting its automatic plunge feed movement, a feature utilized when the machine is set up for grinding a particular diameter size after its operation to grind another diameter size.

The hydraulic operation of the motor 24 is controlled by two valve units 94 and 96 shown in FIG. 3. The valve 94 is comprised of a body 98, in which a sleeve 100 is received for limited axial movement. One end of the sleeve 100 is closed by a cap 102 fixed thereto to form a first piston area. A second piston area is formed on the sleeve 100 by the shoulder 104 and its area is half of the area of the cap 102. The plunger 90 also forms a part of the valve 94. It is slidably received inside the sleeve 100 and is urged outward against the lever arm 88 by a spring 106 inside the sleeve 100. Thus the movement of the wheelhead 10 is mechanically fed back into the hydraulic control circuit by the engagement of the lever arm 88 with the plunger 90.

The other valve unit 96 is comprised of a body 108 in which two valve sleeves 110, 112 are inserted and each of these has a plunger 114, 116 slidably received therein. Each of the plungers 114, 116 is urged outward from the body 108 by a spring 118, 120 respectively. The plunger 114 is stopped against a cam 122 while the plunger 116 is stopped against a pin 124 that in turn is against a screw 126 received through a member 128 from which a hand lever 130 extends. The cam 122 is fixed to the sleeve 110, and the sleeve 110 is rotatable in the body 108 by operation of the lever 130. The member 128 in which the lever 130 is fixed is pivotally attached to the outer flange portion 132 of the sleeve 110 by means of an axle 134. The axle 134 extends across a slot in the flange portion 132 which is adapted to receive the member 128. The member 128 is relieved on its under side away from the axle 134 so that the lever 130 can be manually shifted to the position 136. A spring 138 normally holds the lever 130 in the position shown, however. The screw 126 pushes the pin 124 inward to shift the plunger 116 against the spring 120 when the lever 130 is swung outward to the position 136. The sleeve 110 and lever 130 can also be rotated through an angular range as shown in FIG. 5. The lever 130 can be rotated to the position 140 without swinging it outward on the axle 134 to the position 136, but when it reaches that position a dog portion 142 of the member 128 engages a shoulder 144 on an annular member 146 fixed to the body 108. The lever 130 must then be swung outward to the position 136 to lift the dog 142 over the shoulder 144 to allow the lever 130 and sleeve 110 to be rotated onward to the positions 148, 150. As shown in the development view, FIG. 4, of the cam 122, the plunger 114 is shifted rightward from its initial position as that cam is rotated with the lever 130 and sleeve 110 to the positions 154, 156. To hold the sleeve 110 and the mechanism associated with it in position, a threaded extension 158 of the sleeve is provided on which a nut 160 is engaged, and this bears against the back side of the body 108 to hold the sleeve flange 132 against the annular member 146.

With the hydraulic valves 94, 96 in the conditions shown in FIG. 3, the wheelhead 10 is in a retracted position and is held there by fluid under pressure from a main pressure line 162 which connects around the plunger 90 to a motor line 164 connecting through interdrilling in the shaft 22 and a fluid commutator 166 (FIG. 1) to the motor 24. At this same time, fluid from the pressure line 162 connects through a throttle port 168 to the piston area defined by the cap 102 and from there to a fluid line 170 which connects through the valve body 108 and around the plunger 114 to a discharge throttle port 172. Fluid emitted from the port 172 passes through the line 174 to a back pressure valve 176 and from there it is discharged to the reservoir 178. Fluid under full pressure is also connected directly to the other valve sleeve piston area 104 to oppose the force produced on the end cap 102. The sleeve 100 is initially in a static condition and since the sleeve piston areas 102, 104 are related two to one, the pressure on the area 102 must be half that on the area 104. Therefore, the throttle port 168 attentuates the fluid pressure from the line 162 by an amount equal to the attenuation by the throttle 172 and back pressure valve 176.

To begin the infeed of the wheelhead 10, the lever 130 is swung from its initial position shown in FIG. 5, to the position 140 and the plunger 114 is then shifted axially as shown in FIG. 4 to the position 154. This causes the throttle 172 to be partially closed and the pressure on the end cap 102 momentarily increases to shift the sleeve 100 leftward. This closes the throttle 168 and the sleeve 100 will stop when the pressure at the area 104 is twice the pressure on the end cap 102. The sleeve 100 stops at a place where the pressure line 162 is disconnected from the line 164, and the line 164 is connected with a line 180 connecting in turn to a back pressure valve 182 which discharges to the reservoir 178. A second motor line 184 from the side of the paddle 30 opposite to that to which the line 164 connects is connected through the body 108 to the plunger 116. The plunger 116 blocks the passage of fluid between the line 184 and a line 186 that is now connected past the plunger 90 to the main pressure line 162 due to the shift of the sleeve 100.

The hydraulic circuit of FIG. 3 is now cocked to produce a rapid infeed of the wheelhead 10. The movement of the wheelhead 10 is initiated by pulling outward on the lever 130 to pivot the member 128 causing the plunger 116 to be pushed inward against the spring 120. Pressure is then connected from the line 162 through the lines 186 and 184 to the motor 24 to cause rotation of the paddle 30 and shaft 22 counterclockwise as viewed in FIG. 3. This rotates the shaft 58 to move the roller 74 around the cam 76 which then pivots the lever 70 to push the plunger 78 rightward. The arms 84, 88 are swung to move the arm 83 away from the plunger 90 which follows up due to the force of the spring 106. The motor 24 operates until the plunger 90 blocks the pressure line 162 from the line 186. The system is again in an equilibrium condition, the wheelhead 10 having been shifted through a rapid advance stroke. The paddle 30 in the motor 24 is not yet at the end of its angular stroke, however.

A feed motion of the wheelhead 10 is now produced by a gradual rotation of the lever 130 from the piston 140, FIG. 5, to the position 148 at which time a gradually rising surface 188 on the cam 122 progressively closes the throttle 172 to further shift the sleeve 100 leftward. The pressure line 162 will connect again to the line 186 to swing the paddle 30, but the feedback mechanism will cause the plunger 90 to follow the sleeve 100 so that the connection between the lines 162 and 186 will be near cut-off. The paddle 30 then is swung gradually through its final movement at a rate corresponding to the rate of rotation of the lever 130.

When the paddle 30 swings through its full stroke it engages and is stopped by the wall 28. This occurs when the lever 130 is in the angular position indicated by reference number 148. FIG. 5, and the plunger 90 is also stopped. The lever 130 can still be swung onto the position 150 and the plunger 114 is further shifted as shown in FIG. 4 to the position 156 to cause increased restriction of the throttle 172. The sleeve 108 is moved further leftward but the plunger 90 can no longer follow the sleeve 100. The pressure line 162 is however connected fully to the line 186 and the paddle 30 is held firmly against the wall 28 at the end of its stroke.

The infeed stroke is completed when the paddle 30 reaches the wall 28. To return the machine to its starting condition with the wheelhead 10 retracted, the lever 130 is reversely swung from the position 150, FIG. 5, to its initial position as shown and also moved inward from the position 136, FIG. 3, to its normal position on the axle 134. The throttle 172 is opened and the sleeve 100 is shifted to produce a corresponding opening of the throttle 168. The motor line 164 is reconnected to the pressure line 162 and the paddle is reversely swung in the housing 26 to the other side of the wall 28. Fluid escapes ahead of the returning paddle 30 through the line 184 to a check valve 190 which passes it to the line 186 before it gets to the plunger 116. The line 186 is now connected to a return line 192 to the back pressure valve 176 and from there to the reservoir 178. The system reaches its initial equilibrium condition when the paddle 30 again contacts the wall 28 as shown in FIG. 3.

While the invention has been described in connection with one possible form or embodiment thereof, it is to be understood that the present disclosure is illustrative rather than restrictive and that changes and modifications may be resorted to without departing from the spirit of the invention or the scope of the claims which follow.

What is claimed is:

1. In a precision grinding machine having a wheelhead, a drive shaft connected to the wheelhead for movement thereof when rotated, a paddle motor received on the drive shaft and operable for rotation thereof, and a gear mechanism to rotate the motor and shaft in unison, the combination comprising:

(a) a servo-valve in communication with said motor and having a pair of relatively movable members therein to control the operation of said motor one way and the other when shifted from a predetermined relative position, (b) means to shift one of said control members through a fixed distance in one direction from a starting position and thereafter to continue movement thereof in the same direction at a controlled rate to produce rapid and feed rate operation of said motor in a corresponding direction, said shifting means reversely operable to return said one control member to its starting position to reversely operate said motor, (c) a feedback mechanism responsive to rotation of said drive shaft by said motor to shift said other control member to follow said one control member, said other control member blocking operation of said motor when in said predetermined relative position, and (d) means responsive to rotation of the motor and drive shaft by said gear mechanism to render said feedback mechanism inoperative to shift said other control member.

2. The mechanism of claim 1 wherein:

(a) the feedback mechanism includes,
 (1) a cam,
 (2) a cam follower engaged with said cam, and
 (3) means relatively to move said cam and cam follower when said drive shaft is rotated by said motor, and (b) the means responsive to rotation of said motor and drive shaft operates to prevent relative movement of said cam and cam follower when said gear mechanism rotates said motor and drive shaft.

3. The mechanism of claim 1 wherein:

(a) the feedback mechanism includes,
 (1) a first rotatable member and
 (2) a second rotatable member journalled in said first rotatable member and driven by said drive shaft, said second rotatable member being connected to shift said other control member when rotated relative to said first rotatable member, and (b) the means responsive to rotation of said motor and drive shaft operates to drive said first rotatable member in unison with said second rotatable member to prevent relative movement therebetween.

4. The mechanism of claim 3 wherein the feedback mechanism further includes:

(a) a cam fixed to one of said rotatable members, and (b) a cam follower carried by the other of said rotatable members and connected to produce movement of said other control member when said cam follower is moved relative to said cam.

5. The mechanism of claim 3 wherein:

(a) said second rotatable member has a gear integral therewith, (b) a gear is fixed to said drive shaft and is engaged with the gear of said second member, and (c) said means responsive to rotation of said motor and drive shaft includes
 (1) a gear fixed to said first rotatable member and
 (2) a gear fixed to said motor and engaged with said first rotatable member gear.

6. The mechanism of claim 5 wherein the feedback mechanism includes:

(a) a cam having an inclined annular surface therearound fixed on said first rotatable member, (b) a cam follower mechanism supported on said second rotatable member and rotatable therewith, said cam follower mechanism adapted to engage said inclined cam surface and to move in accordance therewith when said cam and follower mechanism are relatively rotated, and (c) means to shift said other control member in accordance with movement of said follower mechanism.

7. In a grinding machine having a movable wheelhead, a feed mechanism comprising in combination:
 (a) a paddle motor connected to said wheelhead for movement thereof when operated,
 (b) a servo valve connected in fluid circuit to said motor to control the supply of fluid under pressure thereto and having a follow-up control member therein, said valve having an equilibrium state in which said follow-up member blocks fluid under pressure from said motor,
 (c) means to shift said servo-valve from its equilibrium said to supply fluid under pressure to said motor at a plurality of rates for rapid and feed operation of said motor, and
 (d) means to move said follow-up member in a direction tending to restore said equilibrium state in said valve in response to movement of the wheelhead by operation of said paddle motor.

8. The grinding machine feed mechanism of claim 7 wherein:
 (a) a worm wheel is integral with said motor,
 (b) a worm is engaged with said worm wheel and is rotatable to produce positioning movement of the wheelhead, and
 (c) said means to move the follow-up member is responsive only to movement of the wheelhead by operation of said motor.

References Cited in the file of this patent
UNITED STATES PATENTS 3,034,265  Decker _____ May 15, 1962

FOREIGN PATENTS 645,409  Germany _____ May 28, 1937

UNITED STATES PATENT OFFICE
CERTIFICATE OF CORRECTION

Patent No. 3,130,525                                April 28, 1964

Harry E. Luebkemann

It is hereby certified that error appears in the above numbered patent requiring correction and that the said Letters Patent should read as corrected below.

Column 7, line 12, for "said", first occurrence, read -- state --.

Signed and sealed this 15th day of September 1964.

(SEAL)
Attest:

ERNEST W. SWIDER                              EDWARD J. BRENNER
Attesting Officer                                   Commissioner of Patents